US009172861B2

(12) United States Patent
Shigeta

(10) Patent No.: US 9,172,861 B2
(45) Date of Patent: Oct. 27, 2015

(54) IMAGE PICKUP INFORMATION OUTPUT APPARATUS AND LENS APPARATUS EQUIPPED WITH SAME

(71) Applicant: CANON KABUSHIKI KAISHA, Tokyo (JP)

(72) Inventor: Junji Shigeta, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 49 days.

(21) Appl. No.: 13/633,542

(22) Filed: Oct. 2, 2012

(65) Prior Publication Data

US 2013/0083234 A1    Apr. 4, 2013

(30) Foreign Application Priority Data

Oct. 3, 2011    (JP) .................................. 2011-219535

(51) Int. Cl.
*H04N 5/225*    (2006.01)
*H04N 5/222*    (2006.01)
(Continued)

(52) U.S. Cl.
CPC ........... *H04N 5/23212* (2013.01); *H04N 5/232* (2013.01); *H04N 5/23209* (2013.01); *H04N 5/23296* (2013.01); *H04N 13/0207* (2013.01);
(Continued)

(58) Field of Classification Search
CPC .......... H04N 5/23212; H04N 5/23293; H04N 5/23209; H04N 5/23296; H04N 5/2254; G03B 13/36; G03B 17/20
See application file for complete search history.

(56) References Cited

U.S. PATENT DOCUMENTS 7,493,571 B2    2/2009  Shinohara et al.
8,224,172 B2    7/2012  Sasaki
(Continued)

FOREIGN PATENT DOCUMENTS

CN         1671185 A    9/2005
CN       101098409 A    1/2008
(Continued)

OTHER PUBLICATIONS

Extended European Search Report for corresponding EP 12006785.5, mail date Feb. 18, 2014.
(Continued)

*Primary Examiner* — Sinh Tran
*Assistant Examiner* — Shahbaz Nazrul
(74) *Attorney, Agent, or Firm* — Rossi, Kimms & McDowell LLP

(57) ABSTRACT

Image pickup information output apparatus which outputs information about image pickup condition derived from combination of positions/states of condition decision members serving as optical members that affect fulfillment of the condition, comprising: setting unit for setting a condition setting value as the condition to be fulfilled; controller for driving one of the condition decision members to control its position/state based on the condition setting value, condition calculator for calculating information about the condition as calculated condition based on the combination of positions/states of the condition decision members; determination unit for determining whether or not the condition setting value changed; decision unit for determining the information about condition to be output, based on the calculated condition and the determination made by the determination unit as to whether or not the condition setting value changed; and output unit for outputting information about the condition to be output determined by the decision unit.

37 Claims, 9 Drawing Sheets

(51) Int. Cl.
    *H04N 5/232* (2006.01)
    *G03B 13/00* (2006.01)
    *H04N 13/02* (2006.01)

(52) U.S. Cl.
    CPC ....... *H04N 13/0239* (2013.01); *H04N 13/0271* (2013.01)

(56) References Cited

U.S. PATENT DOCUMENTS

| | | |
|---|---|---|
| 8,466,996 B2 | 6/2013 | Sakai et al. |
| 2003/0174233 A1* | 9/2003 | Onozawa ................ 348/349 |
| 2006/0119732 A1* | 6/2006 | Ohta ...................... 348/347 |
| 2010/0178045 A1* | 7/2010 | Hongu .................... 396/80 |
| 2011/0019058 A1 | 1/2011 | Sakai et al. |
| 2011/0176015 A1* | 7/2011 | Yun ..................... 348/208.11 |
| 2011/0181769 A1* | 7/2011 | Ishii ...................... 348/345 |
| 2011/0292257 A1* | 12/2011 | Hatakeyama ............ 348/242 |
| 2013/0038749 A1* | 2/2013 | Hatakeyama et al. ..... 348/222.1 |

FOREIGN PATENT DOCUMENTS

| | | |
|---|---|---|
| CN | 101281290 A | 10/2008 |
| CN | 101963860 A | 2/2011 |
| EP | 0 579 137 A2 | 1/1994 |
| EP | 1 577 876 A1 | 9/2005 |
| EP | 2339827 A2 | 6/2011 |
| JP | 63182620 | 7/1988 |
| JP | 1078464 A | 3/1989 |
| JP | 7306356 A | 11/1995 |
| JP | 2009122524 A | 6/2009 |
| JP | 2011133821 | 7/2011 |
| JP | 2011135604 A | 7/2011 |

OTHER PUBLICATIONS

Official Action issued in EP12006785.5 mailed Oct. 29, 2014.
Office Action issued in CN201210375731.5, mailed Apr. 30, 2015. English translation provided.
Office Action issued in JP2011-219535, mailed Jul. 14, 2015.
Office Action issued in EP12006785.5, mailed Aug. 6, 2015.

* cited by examiner

IMAGE PICKUP INFORMATION OUTPUT APPARATUS AND LENS APPARATUS EQUIPPED WITH SAME

BACKGROUND OF THE INVENTION

1. Field of the Invention

The present invention relates to an image pickup information output apparatus adapted to output image pickup information on an image pickup system which includes a lens apparatus and an image pickup apparatus, and more particularly, to an image pickup information output apparatus adapted to output image pickup information that the lens apparatus has, in the image pickup system which includes the lens apparatus and image pickup apparatus, as well as to the lens apparatus equipped with the image pickup information output apparatus.

2. Description of the Related Art

Conventionally, an image pickup information output apparatus adapted to calculate and display object distance information, focal length information, an f-number, depth of field and an angle of view which are image pickup conditions of a camera is disclosed in Japanese Utility Model Application Laid-Open No. H01-78464, where the image pickup conditions are calculated from focus lens position, zoom lens position and stop position. Also, a three-dimensional image pickup apparatus is known which varies an optical axis angle (referred to as a convergence angle) between left and right lenses during three-dimensional photography, and thereby adjusts a three-dimensional effect of three-dimensional video. In this case, a display control apparatus which calculates and records the convergence angle or a convergence distance based on shift lens position and zoom lens position is disclosed in Japanese Patent Application Laid-Open No. 2011-135604, where the convergence distance is a distance from an image pickup apparatus to a point of intersection between the optical axes of the left and right lenses and the shift lens is used for adjustment of the optical axes.

Japanese Patent Application Laid-Open No. S63-182620 discloses a technique for automatically correcting a deviation of a focusing position by driving a focus lens according to changes in focal length, the focus lens being a varifocal lens which varies focus lens position depending on zoom lens position even when an object distance, which is an image pickup condition, is constant.

Japanese Patent Application Laid-Open No. H07-306356 discloses a technique for displaying an object distance by calculating the object distance from zoom lens position and an operating range of a focus lens, where the focus lens is a varifocal lens which varies focus lens position depending on the zoom lens position even when the object distance, which is an image pickup condition, is constant.

It becomes sometimes necessary to output image pickup conditions of an image pickup lens, such as the object distance, f-number, focal length, depth of field, angle of view, convergence distance at a given time point to the outside such as to an image pickup operator. Since it is necessary to output information about an actual state in which image pickup is performed, when information about the image pickup conditions are acquired from a state of a lens apparatus itself, the image pickup conditions need to be computed and found from positions of plural optical members including the focus lens, zoom lens, stop, and shift lens. Furthermore, these optical members vary with plural image pickup conditions. This involves trouble because even if the image pickup conditions set by the operator is not changed, if a setting of another image pickup condition is changed, image pickup condition information will change. To deal with this, a lens control apparatus is disclosed which makes automatic corrections such that even if an image pickup condition changes, other image pickup conditions will not be affected. However, there can arise a problem in that image pickup condition information will change due to calculation errors in image pickup condition information even if image pickup conditions are fixed during an automatic correction process if changes occur in position detection accuracy errors as a result of synchronization delays among plural optical members or changes in travel ranges of the optical members.

For example, the above problem will be described concretely by taking as an example the object distance of a varifocal lens. With a varifocal lens, position of the focus lens with respect to a predetermined object distance is a function of zoom lens position, and thus the object distance can be found from the focus lens position and zoom lens position. Therefore, in setting an object distance, a targeted focus lens position is determined from the set object distance and zoom lens position. Furthermore, since the zoom lens position changes during the setting of focal length, in order to keep the object distance constant, the focus lens position needs to be adjusted automatically according to the zoom lens position. Automatic object distance adjustment such as described above is disclosed in Japanese Patent Application Laid-Open No. S63-182620.

Furthermore, an object distance display apparatus for a varifocal lens is disclosed in Japanese Patent Application Laid-Open No. H07-306356, where the display apparatus calculates and displays an object distance based on zoom lens position and focus lens position.

Consequently, even if the focal length changes, the object distance can be displayed by maintaining a set object distance.

However, since the focus lens is driven and the object distance is calculated according to zoom lens position, if there is a delay in driving the focus lens with respect to variations in zoom lens position, the focus lens cannot be moved in an instant to the focus lens position corresponding to targeted object distance in response to a change in the focal length, and consequently, the object distance calculated from the zoom lens position and focus lens position deviates by the amount corresponding to the delay in following the change in the focal length. Furthermore, the travel range of the focus lens from infinity to the closest range varies between when the zoom lens position is on a wide-angle side and when the zoom lens position is on a telephoto side while position detection accuracy remains constant even when the focus lens moves, and consequently, the accuracy of object distance corresponding to the focus lens position varies with the focal length. Therefore, since the accuracy of object distance varies with the focal length even if the object distance is the same, the object distance changes even if the automatic object distance adjustment described above is carried out according to the focal length. The change in the object distance may cause the photographer to misunderstand that the lens is malfunctioning. The same is similarly true for the f-number, focal length, depth of field, angle of view, convergence distance in addition to the object distance.

The conventional techniques disclosed in the patent documents described above do not describe how to deal with changes in object distance caused by synchronization errors of the lens or lens position detection accuracy.

SUMMARY OF THE INVENTION

Thus, the present invention provides an image pickup information output apparatus for a camera, wherein when image pickup condition settings are not changed, even if another image pickup condition setting is made, the image pickup information output apparatus does not change image pickup condition information as long as the change of another image pickup condition information is within an allowable range.

To achieve the above object, the present invention provides an image pickup information output apparatus which outputs information about an image pickup condition of a lens apparatus by driving a movable optical member so as to satisfy the image pickup condition, the image pickup information being derived from positions of a plurality of image pickup condition decision optical members which are optical members that affect satisfaction of the image pickup condition, the image pickup information output apparatus including: a setting unit adapted to set an image pickup condition setting value as a position of the movable optical member which satisfies the image pickup condition; a drive controller for driving a movable optical member which is one of the image pickup condition decision optical members to control a position or state of the movable optical member based on the image pickup condition setting value; an image pickup condition calculator adapted to calculate the information about the image pickup condition as a calculated image pickup condition based on the positions of the plurality of image pickup condition decision optical members; a determination unit adapted to determine whether or not there is any change in the image pickup condition setting value; a decision unit adapted to determine image pickup condition information to be output, based on the calculated image pickup condition and the determination made by the determination unit as to whether or not there is any change in the image pickup condition setting value; and an output unit adapted to output information about the image pickup condition.

The present invention can provide an image pickup information output apparatus for a camera, wherein when image pickup condition settings are not changed, even if another image pickup condition setting is made, the image pickup information output apparatus does not change image pickup condition information. This prevents the photographer from misunderstanding that the lens is malfunctioning.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A first embodiment of the present invention will be described below with reference to FIG. 1.

Figure 1:
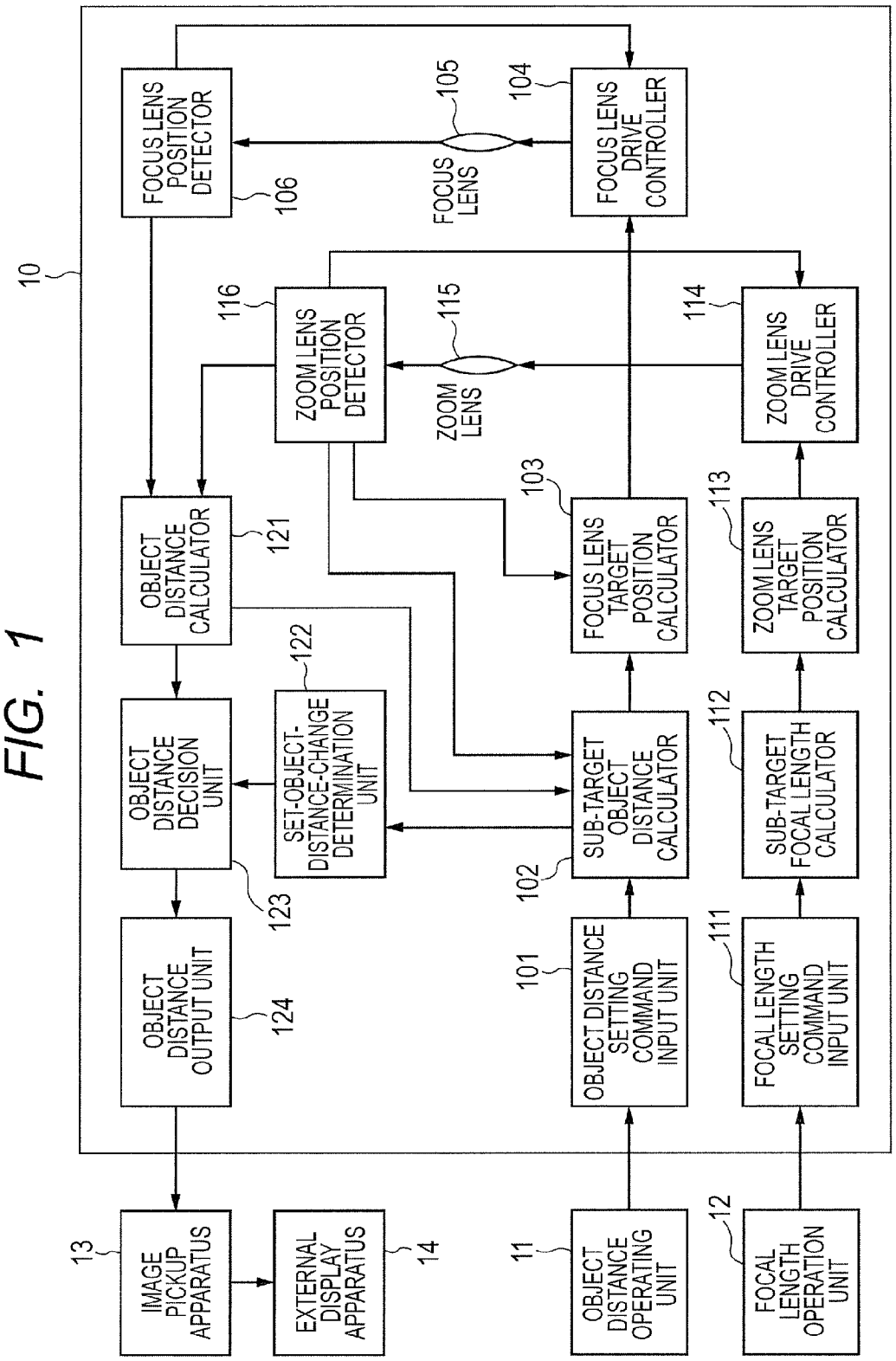
FIG. 1 is a configuration block diagram according to a first embodiment.

FIG. 1 is a configuration block diagram according to the first embodiment. A system illustrated by way of example in the first embodiment includes a lens apparatus 10 adapted to control a movable optical member related to picking up image, an object distance operating unit 11 which is a setting unit connected to the lens apparatus 10, a focal length operating unit 12, an image pickup apparatus 13, and an external display apparatus 14 connected to the image pickup apparatus 13.

The object distance operating unit 11 is used to operate an object distance (in-focus object distance) of the lens apparatus 10 and is made up, for example, of a demand (focus demand) and a camera. The focal length operating unit 12 is used to operate focal length of the lens apparatus 10 and is made up, for example, of a demand (zoom demand) and a camera. The image pickup apparatus 13, which is, for example, a camera, is adapted to capture an object image formed by the lens apparatus 10. The external display apparatus 14 is adapted to display image pickup condition information such as an object distance and is made up, for example, of a viewfinder.

The lens apparatus 10 includes a focus lens 105 used for focus adjustment and a zoom lens 115 used for zoom adjustment.

The focus lens 105 is driven under the control of a focus lens drive controller (drive controller) 104 made up of, for example, a control computation unit and a motor. Position of the focus lens 105 is detected by a focus lens position detector 106 made up of, for example, a Hall element. An object distance (image pickup condition) set command value from the object distance operating unit 11 is input to an object distance set command input unit 101. An object distance set command value (image pickup condition setting value) is input to a sub-target object distance calculator 102, which then calculates a sub-target object distance which provides a target position for the object distance in each control cycle. A method of calculating the sub-target object distance will be described later. Based on the sub-target object distance and current zoom lens position, a focus lens target position calculator 103, which is a sub-target value calculator, calculates a target position (movable optical member target position) of the focus lens per unit time. A method of calculating the movable optical member target position (the focus lens target position) will be described later. The focus lens drive controller 104 performs drive control such that the focus lens position will match a focus lens target position value.

The zoom lens 115 is driven under the control of a zoom lens drive controller 114 made up of, for example, a control computation unit and a motor. A position of the zoom lens 115 is detected by a zoom lens position detector 116 made up of, for example, a Hall element. A focal length set command from the focal length operating unit 12 is input to a focal length setting command input unit 111. A focal length set command value is input to a sub-target focal length calculator 112, which then calculates a sub-target focal length which provides a target position for the focal length in each control cycle. A method of calculating the sub-target focal length will be described later. Based on the sub-target focal length, a zoom lens target position calculator 113 calculates a target position of the zoom lens per unit time. A method of calculating the zoom lens target position will be described later. The zoom lens drive controller 114 performs drive control such that the zoom lens position will match the zoom lens target position.

An object distance calculator 121 which is an image pickup condition calculator calculates object distance information (image pickup condition information) as a calculated image pickup condition based on the focus lens position from the focus lens position detector 106 and the zoom lens position from the zoom lens position detector 116. A method of calculating the object distance will be described later. A set-object-distance-change determination unit 122, which is a determination unit, determines whether or not set object distance changed. A method of determining whether or not set object distance changed will be described later. An object distance decision unit 123, which is a decision unit, determines output object distance information, which is object distance information to be output to the outside. A method of determining the output object distance information will be described later. An object distance output unit 124, which is an output unit, outputs the output object distance information, which is output image pickup condition information, to the outside. According to the present embodiment, the output object distance information is output from the object distance output unit 124 to the image pickup apparatus 13.

Next, a method of calculating the focus lens target position will be described.

Figure 2:
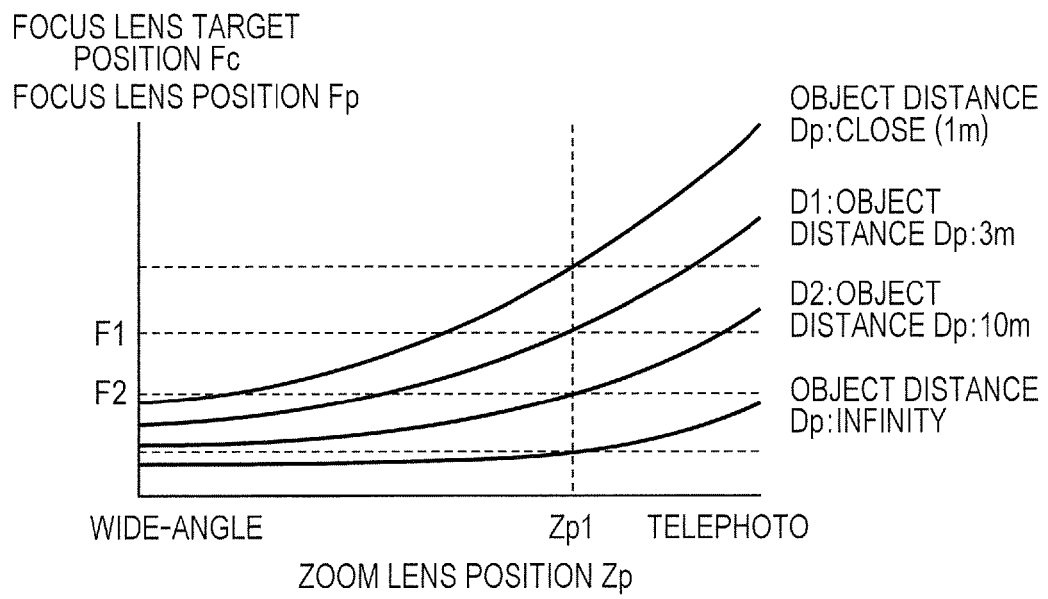
FIG. 2 is a diagram illustrating a relationship among object distance (in-focus object distance), focus lens position, and zoom lens position.

The focus lens target position Fc can be calculated from sub-target object distance Dtc and zoom lens position Zp. FIG. 2 illustrates a relationship among the object distance (in-focus object distance) Dp, focus lens target position Fc, and zoom lens position Zp. The object distance Dp and sub-target object distance Dtc have the same units, and can be considered to be equivalent to each other. To calculate the focus lens target position Fc, it is common practice to convert characteristics as illustrated in FIG. 2 into tabular data in advance and derive the focus lens target position Fc using the object distance Dp and zoom lens position Zp as parameters. For example, if the zoom lens position Zp is Zp1 and the sub-target object distance Dtc is D1, the focus lens target position Fc is F1. Also, if the zoom lens position Zp is Zp1 and the sub-target object distance Dtc is D2, the focus lens target position Fc is F2.

Note that the set command value of the object distance (in-focus object distance) described above may not necessarily be the object distance (in-focus object distance) itself but can be a normalized value of the object distance (in-focus object distance).

Next, a method of calculating the sub-target object distance will be described.

Figure 3:
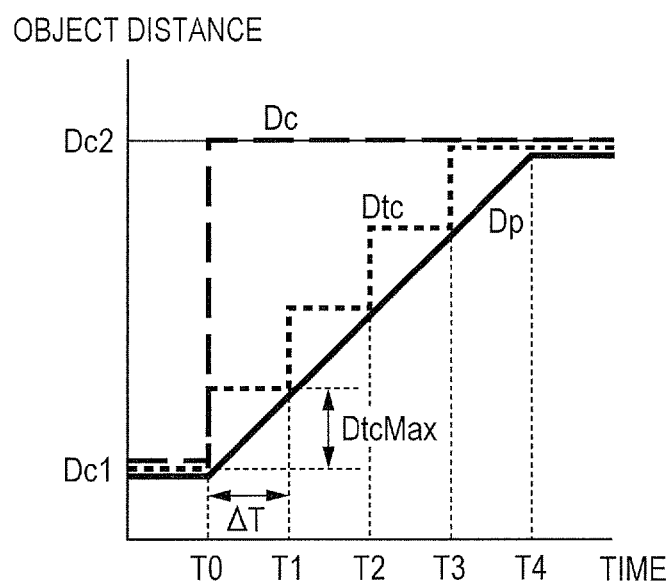
FIG. 3 is a diagram illustrating a relationship between sub-target object distance and object distance with the elapsed time.

FIG. 3 illustrates a relationship between the sub-target object distance Dtc and object distance Dp with the elapsed time when the object distance setting value (image pickup condition setting value) Dc changes from Dc1 to Dc2, where T0 represents the time at which the object distance setting value Dc changes from Dc1 to Dc2 and a unit time ΔT corresponds to the duration of a control cycle. A maximum variation amount DtcMax of the sub-target object distance corresponds to a maximum stroke of the object distance Dp can cover within the unit time ΔT. The maximum variation amount DtcMax of the sub-target object distance can be calculated based on a maximum stroke FcMax of the focus lens per unit time ΔT and tabular data which represents characteristics as illustrated in FIG. 2. For example, when the zoom lens position Zp is Zp1, if focus lens position Fp moves by the maximum stroke FcMax from F1 to F2 within the unit time ΔT, travel distance of the focus lens position is |F2−F1|, and |D2−D1| corresponding thereto is the maximum variation amount DtcMax of the sub-target object distance. A value changed by the maximum variation amount DtcMax of the sub-target object distance is calculated every unit time ΔT until the sub-target object distance Dtc reaches the object distance setting value Dc2. This control allows the actual zoom lens position to keep up with a value indicated every unit time, and consequently, stable control can be achieved without increases in the difference between the target position and the actual position.

Next, a method of calculating the zoom lens target position will be described.

Figure 4:
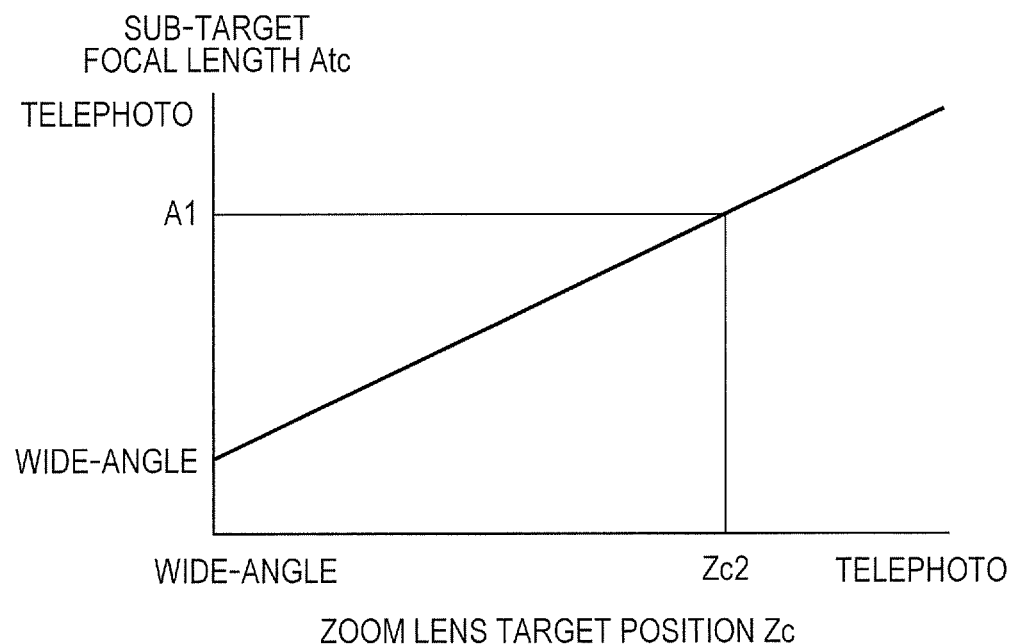
FIG. 4 is a diagram illustrating a relationship between sub-target focal length and zoom lens target position.

Zoom lens target position Zc can be calculated from sub-target focal length Atc. FIG. 4 illustrates a relationship between the sub-target focal length Atc and zoom lens target position Zc. As illustrated in FIG. 4, the relationship between the focal length and zoom lens position is represented by a linear function. To calculate the zoom lens target position Zc, it is common practice to actually measure the relationship between the focal length and zoom lens position as illustrated in FIG. 4, convert the measurements into tabular data in advance, and derive the zoom lens target position Zc. For example, when the sub-target focal length Atc is A1, the zoom lens target position Zc is Zc2.

Next, a method of calculating the sub-target focal length will be described.

Figure 5:
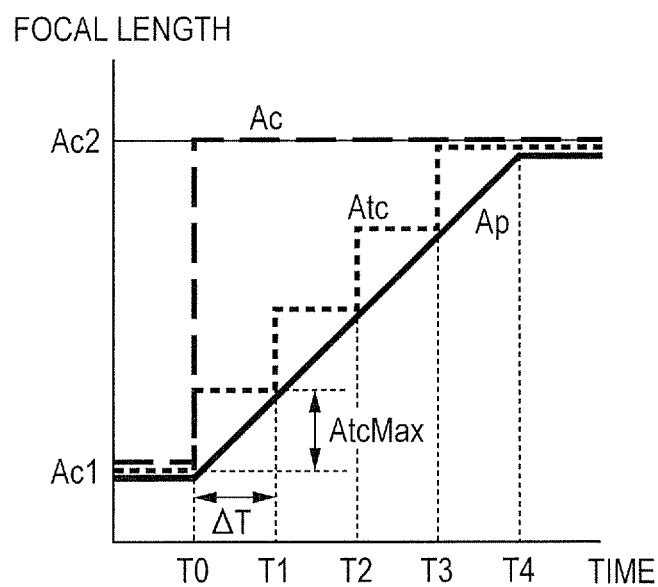
FIG. 5 is a diagram illustrating a relationship between sub-target object distance and focal length with the elapsed time.

FIG. 5 illustrates a relationship between the sub-target focal length Atc and focal length Ap with the elapsed time when a focal length setting value Ac changes from Ac1 to Ac2, where T0 represents the time at which the focal length setting value Ac changes from Ac1 to Ac2 and a unit time ΔT corresponds to the duration of a control cycle. A maximum variation amount AtcMax of the sub-target focal length corresponds to a maximum stroke of the focal length Ap within the unit time ΔT. The maximum variation amount AtcMax of the sub-target focal length can be calculated based on a maximum stroke ZcMax of the zoom lens per unit time ΔT and tabular data which represents characteristics as illustrated in FIG. 4. Since the sub-target focal length Atc and zoom lens target position Zc are proportional to each other as illustrated in FIG. 4, the zoom lens target position Zc is represented by a relationship expressed in Eq. (1).

$$Zc = (Atc \times C11) + C12 \quad (1)$$

where C11 and C12 are predetermined constants determined from measured data.

The maximum stroke ZcMax per unit time ΔT can be calculated from Eq. (2).

$$ZcMax = (AtcMax \times C1) + C2 \quad (2)$$

A value of the sub-target focal length changed by the maximum variation amount AtcMax is calculated every unit time ΔT until the sub-target focal length Atc reaches the focal length setting value Ac2.

Next, a method of calculating the object distance (image pickup condition information) will be described.

The object distance Dp can be calculated from the focus lens position Fp and zoom lens position Zp. That is, the object distance Dp (image pickup condition information) can be calculated by use of the focus lens position Fp and the zoom lens position Zp as a combination of the plurality of image pickup condition decision optical members. To calculate the object distance Dp, it is common practice to convert characteristics as illustrated in FIG. 2 into tabular data in advance and derive the object distance Dp using the table. For example, when the zoom lens position Zp is Zp1 and the focus lens position Fp is F1, the object distance Dp is D1. Also, when the zoom lens position Zp is Zp1 and the focus lens position Fp is F2, the object distance Dp is D2.

As can be seen from FIG. 2, variation amounts of the focus lens position Fp relative to changes in the object distance are smaller when the zoom lens position Zp is on the wide-angle side than when the zoom lens position Zp is on the telephoto side. Position detection accuracy of the focus lens position Fp is equal over the entire operating range of the focus lens, and consequently, the position detection accuracy with respect to changes in the object distance Dp is lower when the zoom lens position Zp is on the wide-angle side than when the zoom lens position Zp is on the telephoto side. Consequently, even if the object distance setting value (image pickup condition setting value) is the same, the object distance Dp has larger position errors when the zoom lens position Zp is on the wide-angle side than when the zoom lens position Zp is on the telephoto side. Therefore, even if the set value of the object distance is not changed, the object distance Dp computed on the wide-angle side of the zoom lens position Zp may have a different value. Thus, if the object distance Dp is displayed as it is, when zoom position is changed, even if the object distance setting value is not changed, the object distance Dp can change as well, causing the photographer to misunderstand that the lens is malfunctioning.

Next, a method of determining any change in the object distance setting value will be described.

Figure 6:
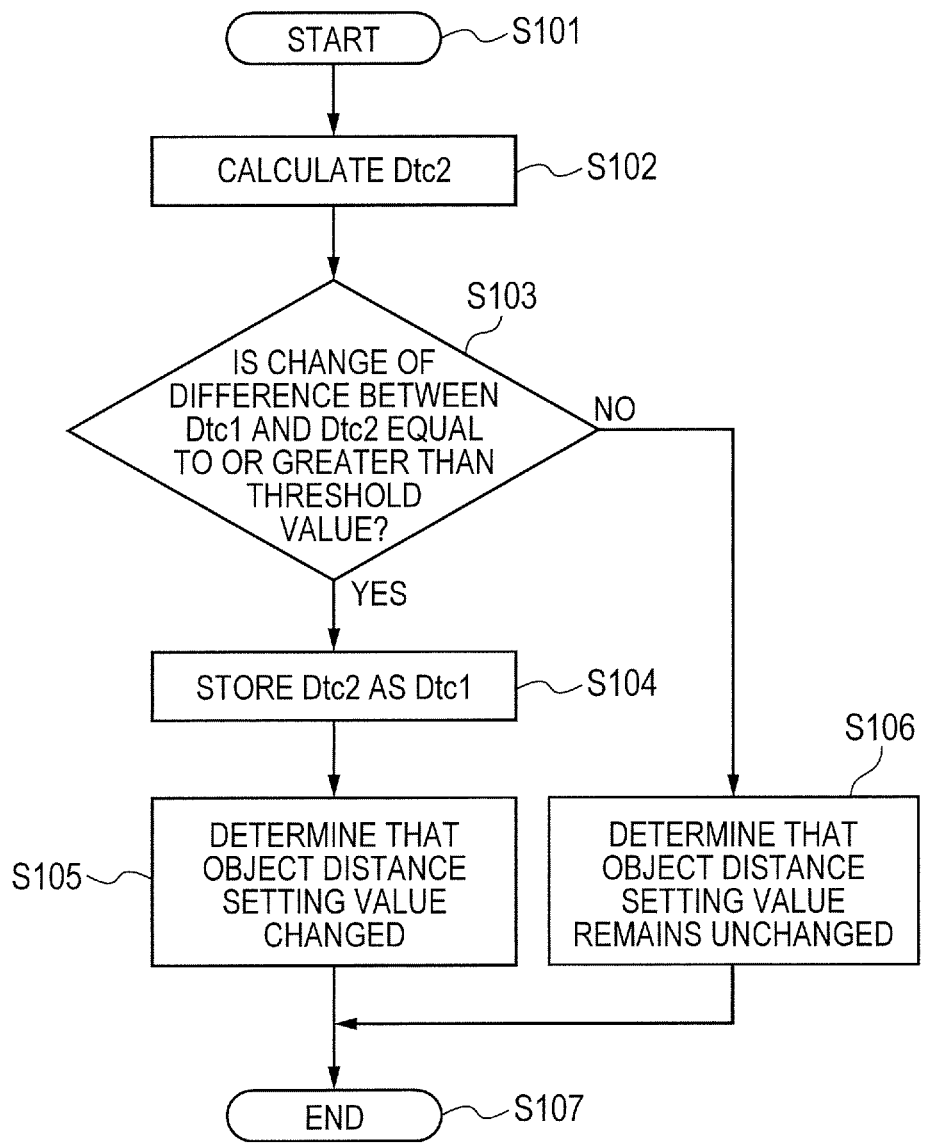
FIG. 6 is a flowchart diagram illustrating procedures for detecting any change in an object distance setting value (image pickup condition setting value).

FIG. 6 is a flowchart illustrating procedures for detecting any change in a setting of the object distance.

Processing is started in S101, and then the flow goes to S102.

In S102, a current sub-target object distance Dtc2 is calculated, and then the flow goes to S103.

In S103, it is determined whether or not a difference between the sub-target object distance Dtc1 stored in the previous time period and the current sub-target object distance Dtc2 is equal to or greater than a predetermined threshold value greater than 0. If the difference is equal to or greater than the threshold value, the flow goes to S104. If the difference is smaller than the threshold value, the flow goes to S106.

In S104, the current sub-target object distance Dtc2 is held for use in a next determination as a sub-target object distance Dtc1 stored in the previous time period. Then, the flow goes to S105.

In S105, it is determined that the object distance setting value changed. Then, the flow goes to S107.

In S106, it is determined that the object distance setting value remains unchanged. Then, the flow goes to S107.

In S107, the processing is finished.

In this way, it is determined whether or not the object distance settings changed.

Although in the process of S103, the sub-target object distance Dtc is used as an instance to be determined whether or not the object distance setting value (hereinafter, also referred to as a set-condition-change determination value) changed, the object distance setting value Dc may be used as a set-condition-change determination value.

Furthermore, the focus lens target position Fc and zoom lens position Zp may be used as set-condition-change determination values. In that case, when the focus lens target position Fc is changed with the zoom lens position Zp remaining unchanged, it can be determined that the focus lens is driven by changes in the object distance setting value rather than by a focal length setting. Therefore, it may be determined that the object distance setting value changed when an amount of change in the focus lens target position Fc is equal to or greater than a predetermined threshold value and an amount of change in the zoom lens position Zp is equal to or smaller than a predetermined threshold value.

Furthermore, the sub-target focal length Atc, focal length setting value Ac, zoom lens target position Zc, zoom lens position Zp or focal length Ap may be used as a set-condition-change determination value.

In that case, when a focal length setting is being made, even if the object distance setting value Dc does not change, the object distance Dp will change. Therefore, if it is determined that a focal length setting is being made, processing similar to that used when there is no change in the object distance setting value is performed to prevent unnecessary fluctuations of the object distance information output from the object distance output unit 124 to equipment outside the lens apparatus 10.

Furthermore, although in the present embodiment, the zoom lens is not moved according to the object distance setting value Dc, if the zoom lens is to be moved according to the object distance setting value Dc, changes in the object distance setting value may be determined based on a relationship between the focus lens target position Fc and zoom lens target position Zc. In that case, when an amount of change in the object distance target position derived from the focus lens target position Fc and zoom lens target position Zc as well as the characteristics in FIG. 2 is within a predetermined threshold value, it may be determined that the object distance setting value remains unchanged.

Figure 7:
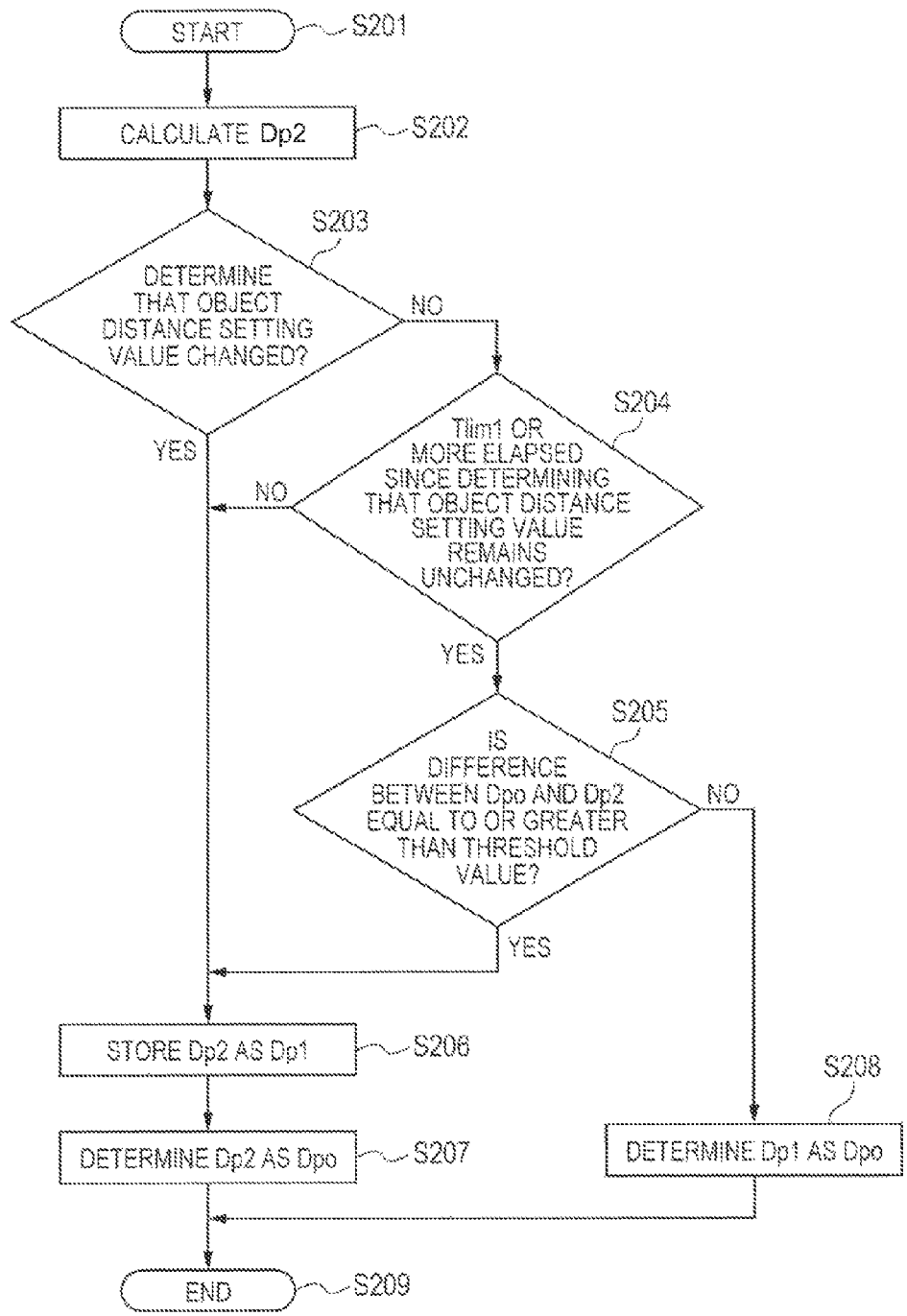
FIG. 7 is a flowchart diagram illustrating procedures for determining output object distance information.

Next, a method of determining the output object distance information will be described. FIG. 7 is a flowchart illustrating procedures for determining output object distance information Dpo.

Processing is started in S201, and then the flow goes to S202.

In S202, the current object distance is calculated as the latest object distance Dp2, and then the flow goes to S203.

In S203, it is determined whether or not the object distance setting value changed. If it is determined that it changed, the flow goes to S206. If it is determined that there is no change, the flow goes to S204.

In S204, by establishing the time point at which determination as to whether or not the object distance setting value switched from "changed" to "remains unchanged" in the previous process as the start time of a no-change period, it is determined whether or not an elapsed time from the start time of the no-change period is equal to or longer than a fixed time period Tlim1 (a first time period which is a predetermined time period longer than 0). A state in which the elapsed time is shorter than the first time period is defined to be an update state and a state in which the elapsed time is equal to or longer than the first time period is defined to be a preservation state. By taking control delays between the sub-target object distance Dtc and object distance Dp into consideration, the fixed time period Tlim1 is set to the unit time ΔT.

If it is determined in S204 that the fixed time period Tlim1 has elapsed, the flow goes to S205. If it is determined that the fixed time period Tlim1 has not elapsed, the flow goes to S206.

In S205, if the difference between the output object distance information Dpo and the latest object distance Dp2 is equal to or greater than a predetermined threshold value ΔDlim (equal to or greater than a first threshold value) greater than 0, the flow goes to S206. If the difference between the output object distance information Dpo and the latest object distance Dp2 is smaller than the predetermined threshold value ΔDlim (smaller than the first threshold value), the flow goes to S208. The threshold value ΔDlim is set to a value larger than an amount of change in the object distance Dp brought about when the focal length is changed from a wide-angle end to a telephoto end, by measuring the amount of change in advance.

In S206, the latest object distance Dp2 is held as a previous object distance Dp1, and then the flow goes to S207. In S207, the latest object distance Dp2 (first image pickup condition information) is determined to be output object distance information Dpo (output image pickup condition information), and then the flow goes to S209. In S208, the previous object distance Dp1 (second image pickup condition information) is determined to be output object distance information Dpo, and then the flow goes to S209. In S209, the processing is finished.

In the process of S208, instead of the previous object distance Dp1, the sub-target object distance Dtc may be determined as output object distance information. Also, a driving period calculated from the difference between the object distance setting value Dc and object distance Dp may be set as the fixed time period Tlim1. Furthermore, instead of the previous object distance Dp1, the object distance setting value Dc may be determined as the output object distance information Dpo.

Next, processes of the first embodiment will be described.

The object distance setting value Dc output from the object distance operating unit 11 is received by the object distance set command input unit 101 and output to the sub-target object distance calculator 102. The sub-target object distance calculator 102 calculates the sub-target object distance Dtc from the object distance setting value Dc and outputs the sub-target object distance Dtc to the focus lens target position calculator 103. The focus lens target position calculator 103 calculates the focus lens target position Fc from the sub-target object distance Dtc and zoom lens position Zp and outputs the focus lens target position Fc to the focus lens drive controller 104. Based on the focus lens target position Fc, the focus lens drive controller 104 drives the focus lens 105 by performing control such that the focus lens position Fp will match the focus lens target position Fc. The focus lens position detector 106 detects the focus lens position Fp and outputs the focus lens position Fp to the object distance calculator 121.

The focal length setting value Ac output from the focal length operating unit 12 is received by the focal length setting command input unit 111 and output to the sub-target focal length calculator 112. The sub-target focal length calculator 112 calculates the sub-target focal length Atc from the focal length setting value Ac and outputs the sub-target focal length Atc to the zoom lens target position calculator 113. The zoom lens target position calculator 113 calculates the zoom lens target position Zc from the sub-target focal length Atc and outputs the zoom lens drive target position Zc to the zoom lens drive controller 114. Based on the zoom lens target position Zc, the zoom lens drive controller 114 drives the zoom lens 115 by performing control such that the zoom lens position Zp will match the zoom lens target position Zc. The zoom lens position detector 116 detects the zoom lens position Zp and outputs the zoom lens position Zp to the object distance calculator 121.

The object distance calculator 121 calculates the object distance (in-focus object distance) Dp from the focus lens position Fp and zoom lens position Zp and outputs the object distance Dp to the object distance decision unit 123. The set-object-distance-change determination unit determines, based on the sub-target object distance Dtc, whether or not the object distance setting value changed and outputs a result of the determination to the object distance decision unit 123. Based on the object distance Dp as well as on the determination result as to whether or not the object distance setting value changed, the object distance decision unit 123 determines output object distance information (information on image pickup conditions to be output) and outputs the output object distance to the object distance output unit 124. The object distance output unit 124 outputs the output object distance information to the image pickup apparatus 13. The image pickup apparatus 13 outputs the output object distance information to the external display apparatus 14.

This enables implementing an image pickup information output apparatus which can avoid a situation in which regardless of the object distance setting value being not changed, the object distance information (in-focus object distance information) to be output is changed due to changes in the focus lens position and zoom lens position or changes in focus lens position detection accuracy.

Although in the first embodiment described above, the object distance setting value from the object distance operating unit is a position command which specifies a target position, similar effects can be obtained even when a velocity command is used. This can be implemented by a method in which the object distance set command input unit 101 calculates the object distance setting value Dc from reference position and a velocity command value. For example, when the velocity command value starts to be received, using the object distance Dp as a reference position, the object distance setting value Dc can be calculated by adding an amount of position change corresponding to the velocity command value to the reference position at each lapse of a unit time.

Also, although in the example described in the first embodiment, the display apparatus is installed outside the lens apparatus 10, the output object distance information may be displayed by installing the display apparatus in the lens apparatus 10.

Furthermore, in the example described above, the image pickup condition is the object distance (in-focus object distance), the movable optical member is the focus lens, and the image pickup condition decision optical members are the focus lens and zoom lens, but similar effects can be obtained when the image pickup condition to be output is depth of field and the movable optical member is a stop and the optical members (image pickup condition decision optical members) which affect the determination (the fulfillment) of the image pickup condition are the focus lens, zoom lens and stop. Note that in such case, the focus lens position, the zoom lens position and the state of stop (f-number) are used to derive the image pickup condition information (depth of field). That is, the focus lens position, the zoom lens position and the state of stop (f-number) are used as the combination of the image pickup condition decision optical members.

A method of calculating the depth of field Df will be described below.

The depth of field Df can be calculated from a rear depth of field Dpb and front depth of field Dpf using Eq. (3), where the rear depth of field Dpb is that part of the depth of field which is located behind the object distance Dp (on the infinity side) while the front depth of field is that part of the depth of field which is located in front of the object distance Dp (on the closest side), the depth of field being a range in which the object in focus appears sharp.

$$Df = Dpb + Dpf \quad (3)$$

Furthermore, the rear depth of field Dpb and front depth of field Dpf can be calculated from the object distance Dp, the focal length Ap, a permissible circle of confusion σ, and an f-number Fno, using equations (4) and (5), respectively.

$$Dpf = (\sigma \times Fno \times Dp^2)/(Ap^2 + (\sigma \times Fno \times Dp)) \quad (4)$$

$$Dpb = (\sigma \times Fno \times Dp^2)/(Ap^2 - (\sigma \times Fno \times Dp)) \quad (5)$$

Thus, the depth of field Df can be calculated using equations (3), (4) and (5).

If the depth of field Df is calculated by the above method and the object distance is replaced with the depth of field, an image pickup information output apparatus can be implemented in which the depth of field is neither changed by changes in the focus lens position and zoom lens position unless the depth of field is changed intentionally nor the depth of field is affected by changes in focus lens position detection accuracy.

Second Embodiment

Next, a second embodiment of the present invention will be described with reference to FIG. 8.

Figure 8:
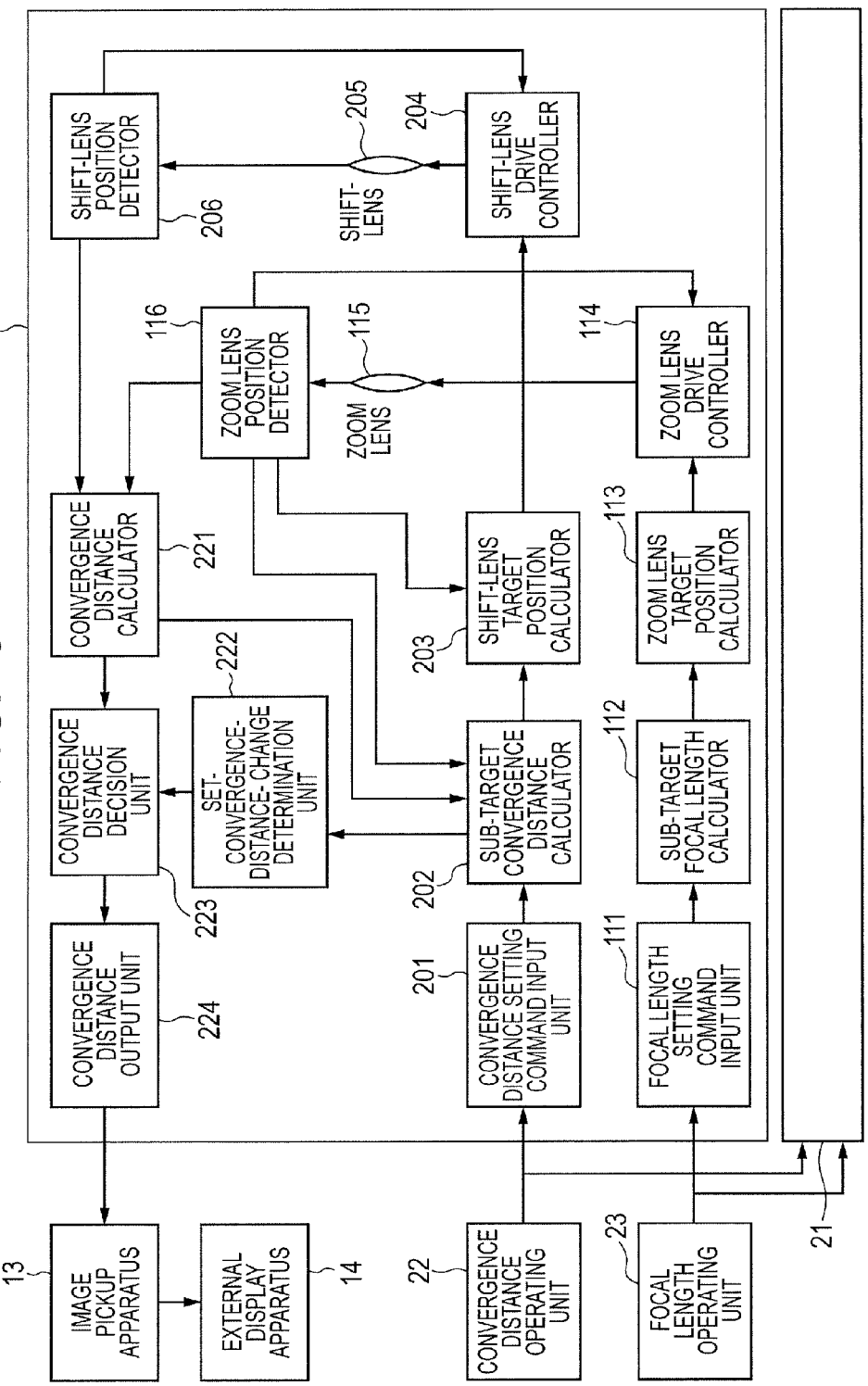
FIG. 8 is a configuration block diagram according to a second embodiment.

FIG. 8 is a configuration block diagram according to the present embodiment, wherein the same components as those in FIG. 1 are denoted by the same reference numerals as the corresponding components in FIG. 1.

In the second embodiment, a method of displaying a convergence distance in a three-dimensional image pickup apparatus will be described.

A lens apparatus 20 and lens apparatus 21 are adapted to control movable optical members for the left eye and right eye, respectively, during photography. The lens apparatus 21 is identical in configuration to the lens apparatus 20. A convergence distance operating unit 22 serving as a setting unit is used to operate the convergence distance between the lens apparatus 20 and lens apparatus 21 and connected to the lens apparatus 20 and lens apparatus 21. The convergence distance operating unit 22 is made up of, for example, a demand and camera. The focal length operating unit 23 is used to operate the focal length of the lens apparatus 20 and lens apparatus 21 and connected to the lens apparatus 20 and lens apparatus 21. The focal length operating unit 23 is made up of, for example, a demand and camera.

The lens apparatus 20 according to the present embodiment includes a shift lens 205 and a shift lens position detector 206, where the shift lens 205 moves in a direction having components perpendicular to optical axes of the respective lens apparatus to move an object image formed on an imaging surface, and thereby producing an effect equivalent to moving optical axis directions of the lens apparatus while the shift lens position detector 206 is made up of, for example, a Hall element.

Besides, the lens apparatus 20 according to the present embodiment includes a convergence distance setting command input unit 201, a sub-target convergence distance calculator 202, a shift lens target position calculator 203, a shift lens drive controller 204, a convergence distance calculator 221 serving as an image pickup condition calculator, a set-convergence-distance-change determination unit 222, a convergence-distance decision unit 223 and a convergence distance output unit 224.

The convergence distance setting command input unit 201 receives a convergence distance setting value (image pickup condition setting value) from outside and the sub-target convergence distance calculator 202 calculates a sub-target convergence distance which provides a target position for the convergence distance in each control cycle based on convergence distance setting value received by the convergence distance setting command input unit 201. A method of calculating the sub-target convergence distance will be described later. Based on the sub-target convergence distance and current zoom lens position, the shift lens target position calculator 203, which is a sub-target value calculator, calculates a target position of the shift lens per unit time. A method of calculating the shift lens target position will be described later. The shift lens drive controller 204, which is made up of, for example, a control computation unit and a motor, performs drive control such that the shift lens position will match the shift lens target position.

The convergence distance calculator 221 calculates the convergence distance based on the shift lens position and zoom lens position. A method of calculating the convergence distance will be described later. The set-convergence-distance-change determination unit 222 serving as a determination unit determines whether or not the convergence distance setting value changed. A method of determining whether or not the convergence distance setting value changed will be described later. The convergence distance decision unit 223 serving as a decision unit determines convergence distance information to be output to the outside. A method of determining output convergence distance information will be described later. The convergence distance output unit 224 serving as an output unit outputs the convergence distance information, which is output image pickup condition information, to the outside.

Next, convergence distance will be described.

Figure 9:
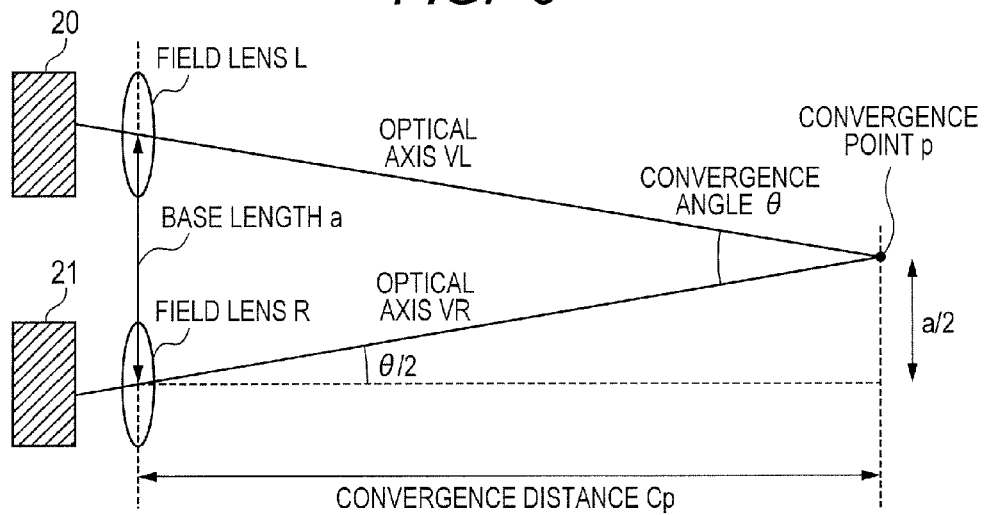
FIG. 9 is a diagram for illustrating convergence distance.

FIG. 9 is a diagram illustrating a relationship among a field lens L, a field lens R, the convergence distance Cp, base length a, an optical axis VL, an optical axis VR, a convergence point p and a convergence angle θ. The optical axis VL is the optical axis of the lens apparatus 20 while the optical axis VR is the optical axis of the lens apparatus 21. The base length a is an interval between the optical axes in the image pickup apparatus, and specifically, is a distance between a center of the field lens L and a center of the field lens R. The convergence point p is a point at which the optical axes VL and VR intersect each other. The convergence angle θ is an angle formed by the optical axes VL and VR intersecting each other at the convergence point p. The convergence distance Cp is the distance from a line joining the field lens L and field lens R of the left and right image pickup apparatuses to the convergence point p.

As illustrated in FIG. 9, the lens apparatus 20 and lens apparatus 21 perform control to drive the shift lenses 205 in opposite directions such that the optical axes VL and VR will move in the opposite directions and intersect each other at the convergence point p.

A relationship among the convergence distance Cp, base length a and convergence angle θ is given by Eq. (6).

$$Cp = (a/2)/\tan(\theta/2) \quad (6)$$

If video shot with the convergence distance Cp is projected onto a screen, a viewer can view three-dimensional video by visually perceiving the video from the lens apparatus 20 with the left eye and the video from the lens apparatus 21 with the right eye. In this case, if the convergence distance Cp which is the distance to the convergence point given as a point of intersection between the optical axes VL and VR is shorter than the distance from the viewer to the screen, the viewer feels as if the object were located in front of the screen and if the convergence distance Cp is longer than the distance from the viewer to the screen, the viewer feels as if the object were located behind the screen.

Next, a method of calculating the shift lens target position will be described.

Figure 10:
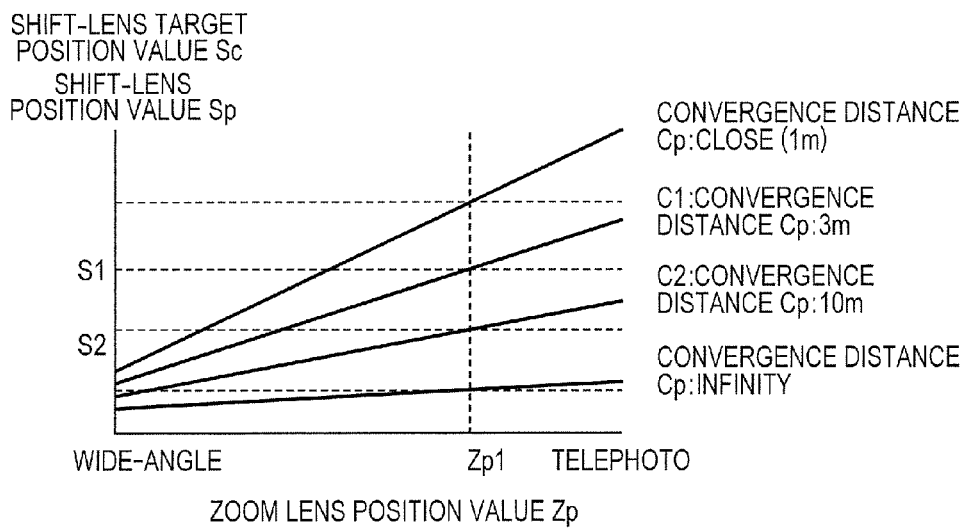
FIG. 10 is a diagram illustrating a relationship among convergence distance position, shift lens position, and zoom lens position.

The shift lens target position Sc can be calculated from the sub-target convergence distance Ctc and zoom lens position Zp. FIG. 10 illustrates a relationship among the convergence distance position Cp, shift lens target position Sc, and zoom lens position Zp. The convergence distance position Cp and sub-target convergence distance Ctc have the same units, and can be considered to be equivalent to each other. To calculate the shift lens target position Sc, it is common practice to convert characteristics as illustrated in FIG. 10 into tabular data in advance and derive the shift lens target position Sc. For example, if the zoom lens position Zp has a value of Zp1 and the sub-target convergence distance Ctc has a value of C1, the shift lens target position Sc has a value of S1. Also, if the zoom lens position Zp has a value of Zp1 and the sub-target convergence distance Ctc has a value of C2, the shift lens target position Sc has a value of S2.

With reference to a position at which the optical axis VL and optical axis VR are parallel to each other, the lens apparatus 21 is controlled so as to move the optical axis VL by the same amount at the same angle as the optical axis VR in a direction opposite to the optical axis VR of the lens apparatus 20.

As can be seen from FIG. 10, amounts of change in the shift lens position Sp relative to changes in the convergence distance are smaller when the zoom lens position Zp is on the wide-angle side than when the zoom lens position Zp is on the telephoto side. Position detection accuracy of the shift lens position Sp is equal over the entire operating range of the shift lens, and consequently, the position detection accuracy with respect to changes in the convergence distance Cp is lower when the zoom lens position Zp is on the wide-angle side than when the zoom lens position Zp is on the telephoto side. Consequently, even if the convergence distance setting value is the same, the convergence distance Cp has larger amounts of position error when the zoom lens position Zp is on the wide-angle side than when the zoom lens position Zp is on the telephoto side. Therefore, the convergence distance Cp computed on the wide-angle side of the zoom lens position Zp may have a different value. Thus, displaying the convergence distance Cp with no change may cause the photographer to misunderstand that the lens is malfunctioning because changing zoom position causes the convergence distance Cp changed regardless of the convergence distance setting value being not changed.

Next, a method of calculating the sub-target convergence distance will be described.

Figure 11:
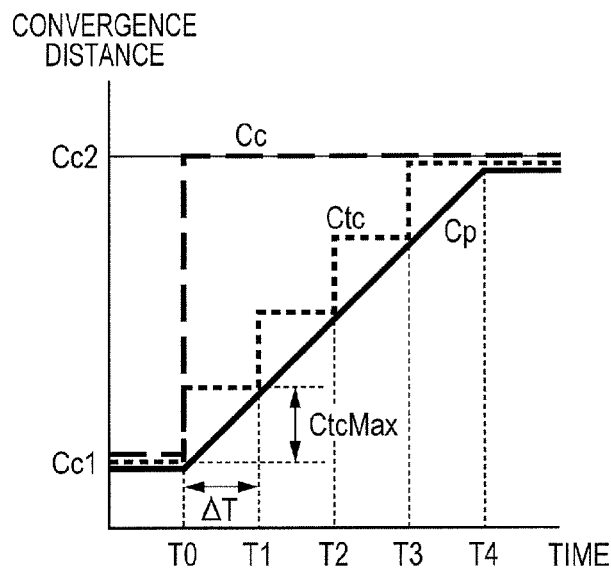
FIG. 11 is a diagram illustrating a relationship between sub-target convergence distance and convergence distance with the elapsed time.

FIG. 11 illustrates a relationship between the sub-target convergence distance Ctc and convergence distance Cp with the elapsed time when a convergence distance setting value (image pickup condition setting value) Cc changes from Cc1 to Cc2, where T0 represents the time at which the convergence distance setting value Cc changes from Cc1 to Cc2 and a unit time ΔT corresponds to the duration of a control cycle.

A maximum variation amount CtcMax of the sub-target convergence distance corresponds to a maximum stroke of the convergence distance Cp within the unit time ΔT. The maximum variation amount CtcMax of the sub-target convergence distance can be calculated based on a maximum stroke ScMax of the shift lens per unit time ΔT and tabular data which represents characteristics as illustrated in FIG. 10. For example, when the zoom lens position Zp is Zp1 and the shift lens position Sp is S1, if the maximum stroke ScMax is |S2−S1|, then the maximum variation amount CtcMax of the sub-target convergence distance is |C2−C1|. A value changed by the maximum variation amount CtcMax of the sub-target convergence distance is calculated every unit time ΔT until the sub-target convergence distance Ctc reaches the convergence distance setting value Cc2.

Next, a method of detecting changes in the convergence distance setting value will be described.

Figure 12:
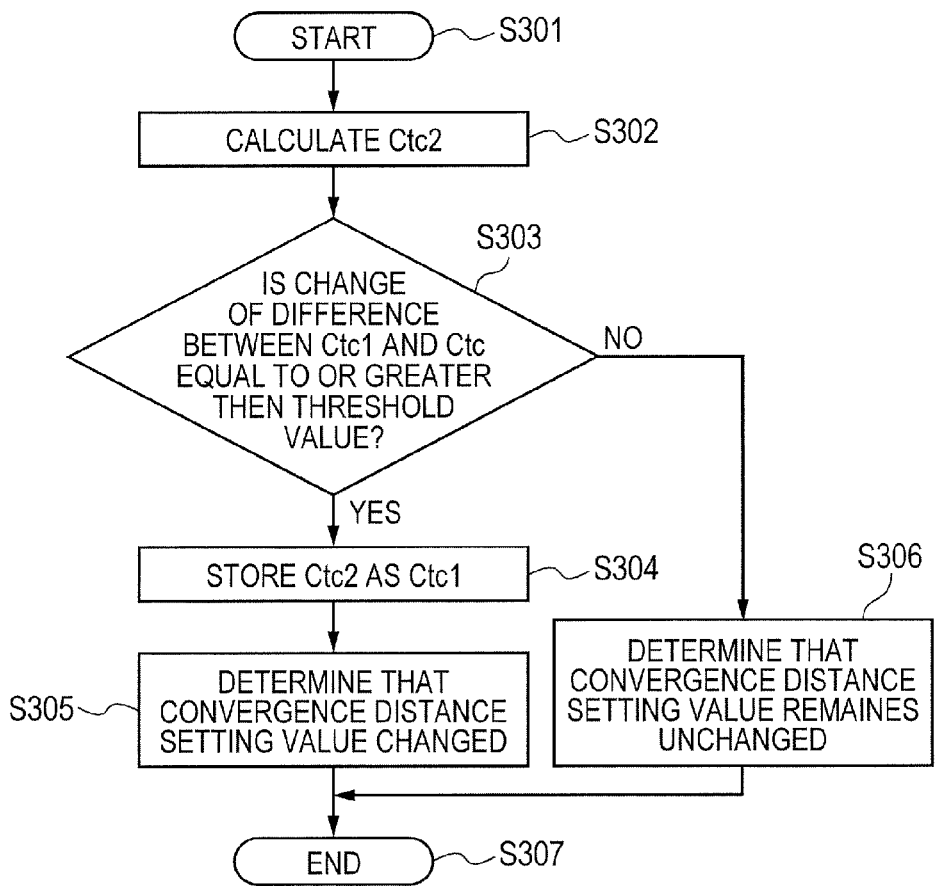
FIG. 12 is a flowchart diagram illustrating procedures for detecting any change in a convergence distance setting value (image pickup condition setting value).

FIG. 12 is a flowchart illustrating procedures for detecting any change in the convergence distance setting value.

Processing is started in S301, and then the flow goes to S302.

In S302, current sub-target convergence distance Ctc2 is calculated, and then the flow goes to S303.

In S303, it is determined whether or not a difference between the sub-target convergence distance Ctc1 stored in the previous time period and the current sub-target convergence distance Ctc2 is equal to or greater than a predetermined threshold value greater than 0. If the difference is equal to or greater than the threshold value, the flow goes to S304. If the difference is smaller than the threshold value, the flow goes to S306.

In S304, the current sub-target convergence distance Ctc2 is held for use in a next determination as a sub-target convergence distance Ctc1 stored in the previous time period. Then, the flow goes to S305.

In S305, it is determined that the convergence distance setting value changed. Then, the flow goes to S307.

In S306, it is determined that the convergence distance setting value remains unchanged. Then, the flow goes to S307.

In S307, the processing is finished.

In this way, any change in the convergence distance setting value is detected.

Although in the process of S302, the sub-target convergence distance Ctc is used as an instance to be determined whether or not the convergence distance setting value changed, the convergence distance setting value Cc may be used as an instance to be checked for the change.

Furthermore, the shift lens target position Sc and zoom lens position Zp may be used as the instances to be checked for the change. In that case, when the shift lens target position Sc is changed with the zoom lens position Zp remaining unchanged, it can be determined that the shift lens is driven by changes in the convergence distance setting value rather than by a focal length setting. Therefore, it may be determined that there is a change in the convergence distance setting value when an amount of change in the shift lens target position Sc is equal to or greater than a predetermined threshold value (equal to or greater than a second threshold value) greater than 0 and an amount of change in the zoom lens position Zp is equal to or smaller than a predetermined threshold value (equal to or smaller than a third threshold value) greater than 0.

Furthermore, the sub-target focal length Atc, focal length setting value Ac, zoom lens target position Zc, zoom lens position Zp or focal length Ap may be used as the instance to be checked for the change.

In that case, when a focal length setting is being made, even if the convergence distance setting value Cc does not change, the convergence distance Cp will change. Therefore, if it is determined that a focal length setting is being made, processing similar to that used when the convergence distance setting value remains unchanged is performed to prevent unnecessary fluctuations of the convergence distance Cp, which is the convergence distance information output from the convergence distance output unit 224 to equipment outside the lens apparatus 20.

Furthermore, although in the present embodiment, the zoom lens position is not moved according to the convergence distance setting value Cc, if the zoom lens position is to be moved according to the convergence distance setting value Cc, changes in the convergence distance setting value may be determined based on a relationship between the shift lens target position Sc and zoom lens target position Zc. In that case, when an amount of change in the convergence distance target position derived from the shift lens target position Sc and zoom lens target position Zc as well as the characteristics in FIG. 2 is within a predetermined threshold value greater than 0, it may be determined that there is no change in the convergence distance setting value.

Next, a method of determining the output convergence distance information will be described.

Figure 13:
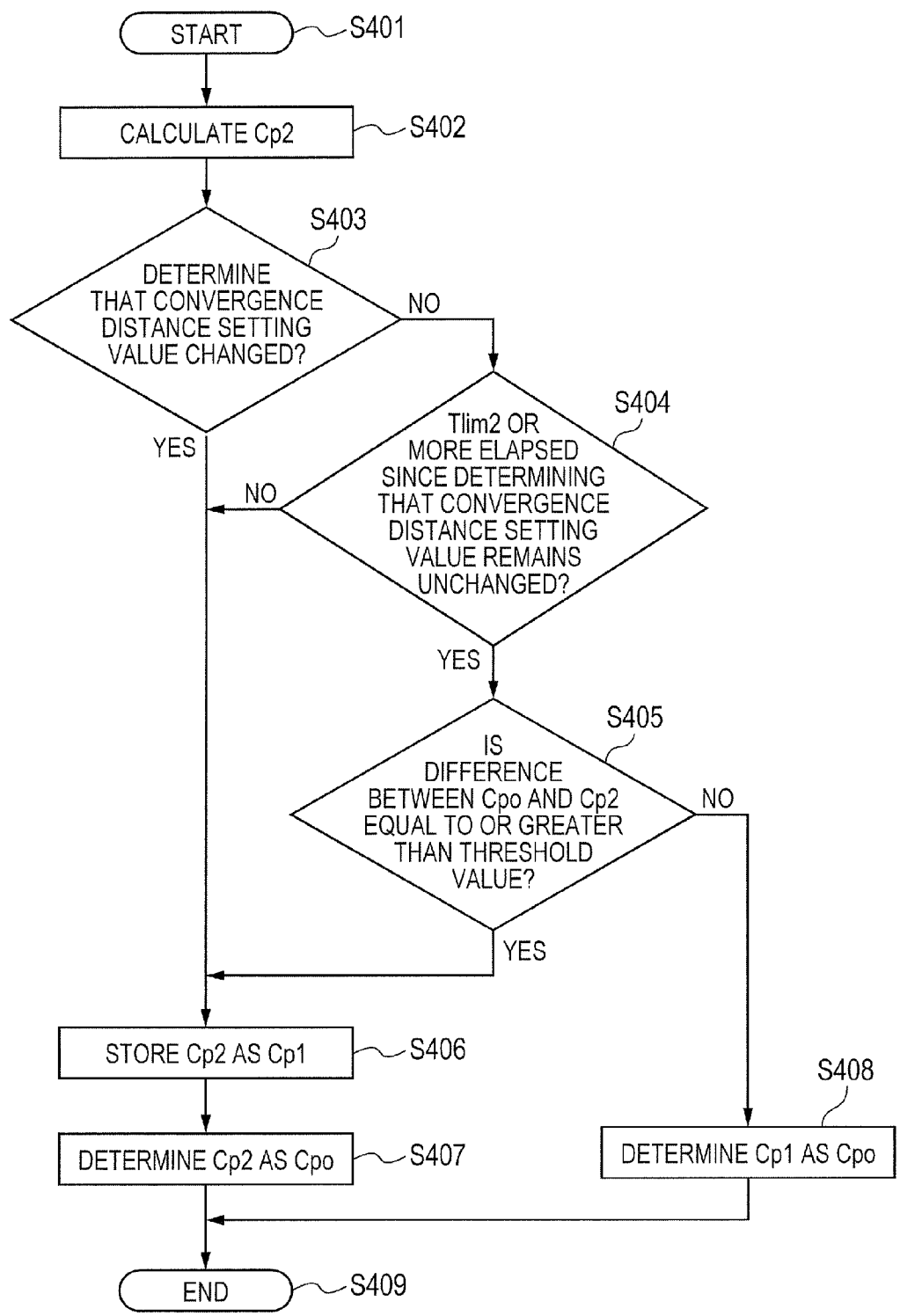
FIG. 13 is a flowchart illustrating procedures for determining output convergence distance information.

FIG. 13 is a flowchart illustrating procedures for determining output convergence distance information Cpo.

Processing is started in S401, and then the flow goes to S402.

In S402, current convergence distance is calculated as the latest convergence distance Cp2, and then the flow goes to S403.

In S403, it is determined whether or not the convergence distance setting value changed. If it is determined that the convergence distance setting value changed, the flow goes to S406. If it is determined that the convergence distance setting value remains unchanged, the flow goes to S404.

In S404, by establishing the time point at which determination as to whether or not the convergence distance setting value changed switched from "changed" to "remains unchanged" in the previous process as the start time of a no-change period, it is determined whether or not an elapsed time from the start time of the no-change period is equal to or longer than a fixed time period Tlim2.

By taking control delays between the sub-target convergence distance Ctc and convergence distance Cp into consideration, the fixed time period Tlim2 is set to the unit time ΔT.

If it is determined in S404 that the fixed time period Tlim2 has elapsed, the flow goes to S405. If it is determined that the fixed time period Tlim2 has not elapsed, the flow goes to S406.

In S405, if the difference between the output convergence distance information Cpo and the latest convergence distance Cp2 is equal to or greater than a predetermined threshold value ΔClim (equal to or greater than a first threshold value) greater than 0, the flow goes to S406. If the difference between the output convergence distance information Cpo and the latest convergence distance Cp2 is smaller than the predetermined threshold value ΔClim (smaller than the first threshold value), the flow goes to S408. The threshold value ΔClim is set to a value larger than an amount of change in the convergence distance Cp brought about when the focal length is changed from the wide-angle end to the telephoto end, by measuring the amount of change in advance.

In S406, the latest convergence distance Cp2 is held as a previous convergence distance Cp1, and then the flow goes to S407. In S407, the latest convergence distance Cp2 (first image pickup condition information) is determined to be output convergence distance information Cpo (output image pickup condition information), and then the flow goes to S409. In S408, the previous convergence distance Cp1 (second image pickup condition information) is determined to be output convergence distance information Cpo, and then the flow goes to S409. In S409, the processing is finished.

In the process of S408, instead of the previous convergence distance Cp1, convergence distance target position Cpc may be determined as output convergence distance information. Also, a driving period calculated from the difference between the convergence distance setting value Cc and convergence distance Cp may be set as the fixed time period Tlim2. Furthermore, instead of the previous convergence distance Cp1, the convergence distance setting value Cc may be determined as the output convergence distance information Cpo.

Next, processes of the second embodiment will be described.

The convergence distance setting value Cc output from the convergence distance operating unit 22 is received by the convergence distance setting command input unit 201 and output to the sub-target convergence distance calculator 202. The sub-target convergence distance calculator 202 calculates the sub-target convergence distance Ctc from the convergence distance setting value Cc and outputs the sub-target convergence distance Ctc to the shift lens target position calculator 203. The shift lens target position calculator 203 calculates the shift lens target position Sc from the sub-target convergence distance Ctc and zoom lens position Zp and outputs the shift lens target position Sc to the shift lens drive controller 204. Based on the shift lens target position Sc, the shift lens drive controller 204 controls to drive the shift lens 205 so that the shift lens position Sp matches the shift lens target position Sc. The shift lens position detector 206 detects the shift lens position Sp and outputs the shift lens position Sp to the convergence distance calculator 221.

The focal length setting value Ac output from the focal length operating unit 23 is received by the focal length setting command input unit 111 and output to the sub-target focal length calculator 112. The sub-target focal length calculator 112 calculates the sub-target focal length Atc from the focal length setting value Ac and outputs the sub-target focal length Atc to the zoom lens target position calculator 113. The zoom lens target position calculator 113 calculates the zoom lens target position Zc from the sub-target focal length Atc and outputs the zoom lens target position Zc to the zoom lens drive controller 114. Based on the zoom lens target position Zc, the zoom lens drive controller 114 controls to drive the zoom lens 115 so that the zoom lens position Zp match the zoom lens target position Zc. The zoom lens position detector 116 detects the zoom lens position Zp and outputs the zoom lens position Zp to the convergence distance calculator 221.

The convergence distance calculator 221 calculates the convergence distance Cp based on the shift lens position Sp and zoom lens position Zp and outputs the convergence distance Cp to the convergence distance decision unit 223. That is, the convergence distance Cp (image pickup condition information) can be calculated by use of the shift lens position Sp and the zoom lens position Zp as a combination of the plurality of image pickup condition decision optical members. The set-convergence-distance-change determination unit determines, based on the sub-target convergence distance Ctc, whether or not the convergence distance setting value changed and outputs a result of the determination to the convergence distance decision unit 223. Based on the convergence distance Cp as well as on the determination result as to whether or not convergence distance setting value changed, the convergence distance decision unit 223 determines output convergence distance information and outputs the output convergence distance information to the convergence distance output unit 224. The convergence distance output unit 224 outputs the output convergence distance information to the image pickup apparatus 13. The image pickup apparatus 13 outputs the output convergence distance information to the external display apparatus 14.

This enables implementing an image pickup information output apparatus which can avoid a situation in which the convergence distance information to be output is changed due to changes in the shift lens position and zoom lens position or changes in shift lens position detection accuracy regardless of the convergence distance setting value remaining unchanged.

Although in the present embodiment, a shift lens for optical axis adjustment is used to control the convergence distance, a variable apex angle prism may be used instead of the shift lens. Alternatively, similar effects can be obtained if the angle formed by the optical axes of the two lens apparatuses is directly controlled by mechanically panning each of the two lens apparatuses.

In the configurations illustrated by way of example in the above embodiments, operating units such as the object distance operating unit 11, focal length operating units 12 and 23, and convergence distance operating unit 22 are provided on cameras and demands, the external display apparatus 14 is connected to the image pickup apparatus 13, and the other components are included in the lens apparatuses 10 and 20. However, the present invention is not limited to this. Except optical components such as the lenses and stop as well as drive controllers and position detectors therefor, the components included in the lens apparatus 10 or 20 illustrated in FIG. 1 or 8 may be provided on apparatuses except the lens apparatus, for example, in a console device, camera, or independent control apparatus. Conversely, although operating units such as the object distance operating unit 11, focal length operating units 12 and 23, and convergence distance operating unit 22 as well as the external display apparatus have been described as being installed outside the lens apparatus, this is not restrictive, and effects of the present invention can be achieved similarly even if these components are installed in the lens apparatus. Although the convergence distance is exemplified as the image pickup condition in the second embodiment described above, the convergence angle can be used as the image pickup condition to obtain the advantageous effect of the present invention.

While the present invention has been described with reference to exemplary embodiments, it is to be understood that the invention is not limited to the disclosed exemplary embodiments and that various modifications and changes can be made within the scope of the invention. The scope of the following claims is to be accorded the broadest interpretation so as to encompass all such modifications and equivalent structures and functions.

This application claims the benefit of Japanese Patent Application No. 2011-219535, filed Oct. 3, 2011, which is hereby incorporated by reference herein in its entirety.

What is claimed is:

1. An image pickup information output apparatus which outputs information about an image pickup condition derived from a combination of positions or states of a plurality of image pickup condition decision optical members serving as optical members that affect fulfillment of the image pickup condition, comprising:
   a setting unit configured to set an image pickup condition setting value as the image pickup condition to be fulfilled;
   a drive controller configured to drive a movable optical member which is one of the image pickup condition decision optical members to control a position or state of the movable optical member based on the image pickup condition setting value;
   an image pickup condition deriving unit configured to derive an information about the image pickup condition as a derived image pickup condition based on the combination of positions or states of the plurality of image pickup condition decision optical members;
   a determination unit configured to determine whether or not the image pickup condition setting value changed;
   a decision unit configured to determine the information about image pickup condition to be output, based on the information about the derived image pickup condition and the determination made by the determination unit as to whether or not the image pickup condition setting value changed; and
   an output unit configured to output information about the image pickup condition to be output determined by the decision unit,
   wherein the decision unit determines a first image pickup condition as the information about image pickup condition to be output when the determination unit determines the image pickup condition setting value being changed, and determines a second image pickup condition, which is different from the first image pickup condition, as the information about image pickup condition to be output when the determination unit does not determine the image pickup condition setting value being changed.

2. An image pickup information output apparatus which outputs information about an image pickup condition derived from a combination of positions or states of a plurality of image pickup condition decision optical members serving as optical members that affect fulfillment of the image pickup condition, comprising:
   a setting unit configured to set an image pickup condition setting value as the image pickup condition to be fulfilled;
   a drive controller configured to drive a movable optical member which is one of the image pickup condition decision optical members to control a position or state of the movable optical member based on the image pickup condition setting value;
   an image pickup condition deriving unit configured to derive an information about the image pickup condition as a derived image pickup condition based on the combination of positions or states of the plurality of image pickup condition decision optical members;
   a determination unit configured to determine whether or not the image pickup condition setting value changed;
   a decision unit configured to determine the information about image pickup condition to be output, based on the information about the derived image pickup condition and the determination made by the determination unit as to whether or not the image pickup condition setting value changed; and
   an output unit configured to output information about the image pickup condition to be output determined by the decision unit,
   wherein:
   the determination unit determines whether or not the image pickup condition setting value changed based on a set-condition-change determination value representing a change in the image pickup condition setting value;
   the decision unit determines a state from a time when the determination unit determines that the image pickup condition setting value changed until a first time period elapses as an update state and determines a state other than the update state as a preservation state; and the decision unit sets a first image pickup condition information as the image pickup condition information to be output in the update state while sets a second image pickup condition information as the image pickup condition information to be output in the preservation state.

3. An image pickup information output apparatus which outputs information about an image pickup condition derived from a combination of positions or states of a plurality of image pickup condition decision optical members serving as optical members that affect fulfillment of the image pickup condition, comprising:

a setting unit configured to set an image pickup condition setting value as the image pickup condition to be fulfilled;

a drive controller configured to drive a movable optical member which is one of the image pickup condition decision optical members to control a position or state of the movable optical member based on the image pickup condition setting value;

an image pickup condition deriving unit configured to derive an information about the image pickup condition as a derived image pickup condition based on the combination of positions or states of the plurality of image pickup condition decision optical members;

a determination unit configured to determine whether or not the image pickup condition setting value changed;

a decision unit configured to determine the information about image pickup condition to be output, based on the information about the derived image pickup condition and the determination made by the determination unit as to whether or not the image pickup condition setting value changed; and an output unit configured to output information about the image pickup condition to be output determined by the decision unit, wherein:

the determination unit determines whether or not the image pickup condition setting value changed based on a set-condition-change determination value representing a change in the image pickup condition setting value;

the decision unit determines a state from a time when the determination unit determines that the image pickup condition setting value changed until a first time period elapses to be an update state and determines a state other than the update state to be a preservation state; and the decision unit sets a first image pickup condition information as the image pickup condition information to be output in the update state, while in the preservation state, the decision unit sets the first image pickup condition information as the image pickup condition information to be output when a difference between the first image pickup condition information and a second image pickup condition information is equal to or greater than a first threshold value and sets the second image pickup condition information as the image pickup condition information to be output when the difference is smaller than the first threshold value.

4. The image pickup information output apparatus according to claim 3, wherein the first threshold value is greater than an amount of change of the first image pickup condition information when the image pickup condition setting value is not changed.

5. The image pickup information output apparatus according to claim 2, wherein:

the set-condition-change determination value comprises the image pickup condition setting value; and the determination unit determines that the image pickup condition setting value changed in a case where an amount of change in the set-condition-change determination value is equal to or greater than a predetermined threshold value.

6. The image pickup information output apparatus according to claim 2, wherein:

the set-condition-change determination value comprises a set value of another image pickup condition which affects operation of the movable optical member; and the determination unit determines that the image pickup condition setting value remains unchanged in a case where an amount of change in the set-condition-change determination value is equal to or greater than a predetermined threshold value.

7. The image pickup information output apparatus according to claim 2, wherein:

the set-condition-change determination value comprises a position of an image pickup condition decision optical member other than the movable optical member; and the determination unit determines that the image pickup condition setting value remains unchanged in a case where an amount of change in the set-condition-change determination value is equal to or greater than a predetermined threshold value.

8. The image pickup information output apparatus according to claim 2, further comprising a unit configured to derive a movable optical member target position from the image pickup condition setting value, the movable optical member target position being a drive target position of the movable optical member, wherein the set-condition-change determination value comprises the drive target position and a position of an image pickup condition decision optical member other than the movable optical member; and the determination unit determines that the image pickup condition setting value changed in a case where an amount of change in the movable optical member target position is equal to or greater than a second threshold value and an amount of change in the set-condition-change determination value is equal to or smaller than a third threshold value.

9. The image pickup information output apparatus according to claim 2, further comprising a unit configured to derive movable optical member target positions based on the image pickup condition setting value, the movable optical member target positions being respective target positions of two or more movable optical members, wherein the set-condition-change determination value comprises drive target positions of the respective image pickup condition decision optical members; and the determination unit determines whether or not the image pickup condition setting value changed based on a relationship among the drive target positions of the respective image pickup condition decision optical members.

10. The image pickup information output apparatus according to claim 2, further comprising:

a sub-target value deriving unit configured to derive a sub-target value based on the image pickup condition setting value and on the image pickup condition information derived by the image pickup condition deriving unit, the sub-target value serving as a target for the image pickup condition within a unit time; and a unit configured to control driving of the movable optical member according to the sub-target value, wherein the set-condition-change determination value comprises the sub-target value.

11. The image pickup information output apparatus according to claim 2, wherein:
the first image pickup condition information is the latest image pickup condition information derived by the image pickup condition deriving unit; and
the second image pickup condition information is image pickup condition information derived by the image pickup condition deriving unit immediately before a change from the update state to the preservation state.

12. The image pickup information output apparatus according to claim 2, wherein:
the first image pickup condition information is the latest image pickup condition information derived by the image pickup condition deriving unit; and
the second image pickup condition information is the image pickup condition setting value.

13. The image pickup information output apparatus according to claim 10, wherein:
the first image pickup condition information is the latest image pickup condition information derived by the image pickup condition deriving unit; and
the second image pickup condition information is the sub-target value.

14. The image pickup information output apparatus according to claim 1, wherein:
the image pickup condition is an object distance;
the movable optical member is a focus lens; and
the plurality of image pickup condition decision optical members comprises the focus lens and a zoom lens.

15. An image pickup information output apparatus which outputs information about an image pickup condition derived from a combination of positions or states of a plurality of image pickup condition decision optical members serving as optical members that affect fulfillment of the image pickup condition, comprising:
a setting unit configured to set an image pickup condition setting value as the image pickup condition to be fulfilled;
a drive controller configured to drive a movable optical member which is one of the image pickup condition decision optical members to control a position or state of the movable optical member based on the image pickup condition setting value;
an image pickup condition deriving unit configured to derive an information about the image pickup condition as a derived image pickup condition based on the combination of positions or states of the plurality of image pickup condition decision optical members;
a determination unit configured to determine whether or not the image pickup condition setting value changed;
a decision unit configured to determine the information about image pickup condition to be output, based on the information about the derived image pickup condition and the determination made by the determination unit as to whether or not the image pickup condition setting value changed; and
an output unit configured to output information about the image pickup condition to be output determined by the decision unit,
wherein:
the image pickup condition is a convergence distance or a convergence angle;

the movable optical member is a shift lens for optical axis adjustment or a variable apex angle prism; and
the plurality of image pickup condition decision optical members comprises a shift lens or a variable apex angle prism, and a zoom lens.

16. The image pickup information output apparatus according to claim 1, wherein:
the image pickup condition is a depth of field;
the movable optical member is a stop; and
the plurality of image pickup condition decision optical members comprises the stop, a focus lens and a zoom lens.

17. A lens apparatus comprising:
an image pickup information output apparatus which outputs information about an image pickup condition derived from a combination of positions or states of a plurality of image pickup condition decision optical members serving as optical members that affect fulfillment of the image pickup condition, the image pickup information output apparatus comprising:
a setting unit configured to set an image pickup condition setting value as the image pickup condition to be fulfilled;
a drive controller configured to drive a movable optical member which is one of the image pickup condition decision optical members to control a position or state of the movable optical member based on the image pickup condition setting value;
an image pickup condition deriving unit configured to derive an information about the image pickup condition as a derived image pickup condition based on the combination of positions or states of the plurality of image pickup condition decision optical members;
a determination unit configured to determine whether or not the image pickup condition setting value changed;
a decision unit configured to determine the information about image pickup condition to be output, based on the information about the derived image pickup condition and the determination made by the determination unit as to whether or not the image pickup condition setting value changed; and
an output unit configured to output information about the image pickup condition determined by the decision unit,
wherein the decision unit determines a first image pickup condition as the information about image pickup condition to be output when the determination unit determines the image pickup condition setting value being changed, and determines a second image pickup condition, which is different from the first image pickup condition, as the information about image pickup condition to be output when the determination unit does not determine the image pickup condition setting value being changed.

18. An information output apparatus, comprising:
a setting unit configured to set an object distance setting value;
a drive controller configured to control a drive of a focus lens so as to suppress a change of an object distance information which is based on a change of a position of a zoom lens;
a deriving unit configured to derive the object distance information based on a position of the focus lens and a position of the zoom lens;
a determination unit configured to determine whether or not the object distance setting value changed; and
an output unit configured to output a first object distance information derived by the deriving unit or a second object distance information derived prior to the first object distance information by the deriving unit based on the determination made by the determination unit,
wherein the output unit outputs the first object distance information when the determination unit determines the object distance setting value being changed, and continues to output the second object distance information when the determination unit does not determine the object distance setting value being changed.

19. The information output apparatus according to claim 18, configured such that:
the determination unit determines whether or not the object distance setting value changed based on a set-condition-change determination value representing a change in the object distance setting value; the output unit determines a state from a time when the determination unit determines that the object distance setting value changed until a first time period elapses as an update state and determines a state other than the update state as a preservation state; and
the output unit sets the first object distance information as the object distance information to be output in the update state while sets the second object distance information as the object distance information to be output in the preservation state.

20. The information output apparatus according to claim 18, configured such that:
the determination unit determines whether or not the object distance setting value changed based on a set-condition-change determination value representing a change in the object distance setting value;
the output unit determines a state from a time when the determination unit determines that the object distance setting value changed until a first time period elapses to be an update state and determines a state other than the update state to be a preservation state; and
the output unit sets the first object distance information as the object distance information to be output in the update state, while in the preservation state, the output unit sets the first object distance information as the object distance information to be output when a difference between the first object distance information and the second object distance information is equal to or greater than a first threshold value and sets the second object distance information as the object distance information to be output when the difference is smaller than the first threshold value.

21. The information output apparatus according to claim 20, wherein the first threshold value is greater than an amount of change of the first object distance information when the object distance setting value is not changed.

22. The information output apparatus according to claim 19, wherein:
the set-condition-change determination value comprises the object distance setting value; and
the determination unit is configured to determine that the object distance setting value changed in a case where an amount of change in the set-condition-change determination value is equal to or greater than a predetermined threshold value.

23. The information output apparatus according to claim 19, wherein:
the set-condition-change determination value comprises a set value which affects operation of the focus lens; and
the determination unit is configured to determine that the object distance setting value remains unchanged in a case where an amount of change in the set-condition-change determination value is equal to or greater than a predetermined threshold value.

24. The information output apparatus according to claim 19, wherein:
the set-condition-change determination value comprises a position of the zoom lens; and
the determination unit is configured to determine that the object distance setting value remains unchanged in a case where an amount of change in the set-condition-change determination value is equal to or greater than a predetermined threshold value.

25. The information output apparatus according to claim 19, further comprising a unit configured to calculate a focus lens target position from the object distance setting value, the focus lens target position being a drive target position of the focus lens,
wherein the set-condition-change determination value comprises the drive target position and a position of the zoom lens; and
the determination unit is configured to determine that the object distance setting value changed in a case where an amount of change in the focus lens target position is equal to or greater than a second threshold value and an amount of change in the set-condition-change determination value is equal to or smaller than a third threshold value.

26. The information output apparatus according to claim 19, further comprising a unit configured to calculate focus lens target positions based on the object distance setting value, the focus lens target positions being respective target positions of two or more focus lenses,
wherein the set-condition-change determination value comprises drive target positions of the focus lens and the zoom lens; and
the determination unit is configured to determine whether or not the object distance setting value changed based on a relationship among the drive target positions of the focus lens and the zoom lens.

27. The information output apparatus according to claim 19, further comprising:
a sub-target value calculator configured to calculate a sub-target value based on the object distance setting value and on the object distance information derived by the deriving unit, the sub-target value serving as a target for the object distance information within a unit time; and
a unit configured to control driving of the focus lens according to the sub-target value,
wherein the set-condition-change determination value comprises the sub-target value.

28. The information output apparatus according to claim 19, wherein:
the first object distance information is the latest object distance information derived by the deriving unit; and
the second object distance information is object distance information derived by the deriving unit immediately before a change from the update state to the preservation state.

29. The information output apparatus according to claim 19, wherein:
the first object distance information is the latest object distance information derived by the deriving unit; and
the second object distance information is the object distance setting value.

30. The information output apparatus according to claim 27, wherein:
the first object distance information is the latest object distance information derived by the deriving unit; and the second object distance information is the sub-target value.

31. A lens apparatus comprising:
a focus lens;
a zoom lens;
an information output apparatus, comprising:
a setting unit configured to set an object distance setting value;
a drive controller configured to control a drive of the focus lens so as to suppress a change of an object distance information which is based on a change of a position of the zoom lens;
a deriving unit configured to derive the object distance information based on a position of the focus lens and a position of the zoom lens;
a determination unit configured to determine whether or not the object distance setting value changed; and
an output unit configured to output a first object distance information derived by the deriving unit or a second object distance information derived prior to the first object distance information by the deriving unit based on the determination made by the determination unit,
wherein the output unit outputs the first object distance information when the determination unit determines the object distance setting value being changed, and continues to output the second object distance information when the determination unit does not determine the object distance setting value being changed.

32. An information output apparatus, comprising:
a setting unit configured to set a depth of field setting value;
a drive controller configured to control a drive of a stop so as to suppress a change of a depth of field information which is based on a change of at least one of a position of a focus lens and a position of a zoom lens;
a deriving unit configured to derive the depth of field information based on a state of the stop, a position of the focus lens and a position of the zoom lens;
a determination unit configured to determine whether or not the depth of field setting value changed; and
an output unit configured to output a first depth of field information derived by the deriving unit or a second depth of field information derived prior to the first depth of field information by the deriving unit based on the determination made by the determination unit,
wherein the output unit outputs the first depth of field information when the determination unit determines the depth of field setting value being changed, and outputs the second depth of field information when the determination unit does not determine the depth of field setting value being changed.

33. A lens apparatus comprising:
a stop;
a focus lens;
a zoom lens;
an information output apparatus, comprising:
a setting unit configured to set a depth of field setting value;
a drive controller configured to control a drive of the stop so as to suppress a change of a depth of field information which is based on a change of at least one of a position of the focus lens and a position of the zoom lens;
a deriving unit configured to derive the depth of field information based on a state of the stop, a position of the focus lens and a position of the zoom lens;
a determination unit configured to determine whether or not the depth of field setting value changed; and
an output unit configured to output a first depth of field information derived by the deriving unit or a second depth of field information derived prior to the first depth of field information by the deriving unit based on the determination made by the determination unit,
wherein the output unit outputs the first depth of field information when the determination unit determines the depth of field setting value being changed, and outputs the second depth of field information when the determination unit does not determine the depth of field setting value being changed.

34. An information output apparatus, comprising:
a setting unit configured to set a convergence distance setting value;
a drive controller configured to control a drive of a shift lens or a variable apex angle prism so as to suppress a change of a convergence distance information which is based on a change of a position of a zoom lens;
a deriving unit configured to derive the convergence distance information based on a position of the shift lens or a state of the variable apex angle prism, and a position of the zoom lens;
a determination unit configured to determine whether or not the convergence distance setting value changed; and
an output unit configured to output a first convergence distance information derived by the deriving unit or a second convergence distance information derived prior to the first convergence distance information by the deriving unit based on the determination made by the determination unit,
wherein the output unit outputs the first convergence distance information when the determination unit determines the convergence distance setting value being changed, and outputs the second convergence distance information when the determination unit does not determine the convergence distance setting value being changed.

35. A lens apparatus comprising:
a shift lens or a variable apex angle prism;
a zoom lens;
an information output apparatus, comprising:
a setting unit configured to set a convergence distance setting value;
a drive controller configured to control a drive of the shift lens or the variable apex angle prism so as to suppress a change of a convergence distance information which is based on a change of a position of the zoom lens;
a deriving unit configured to derive the convergence distance information based on a position of the shift lens or a state of the variable apex angle prism, and a position of the zoom lens;
a determination unit configured to determine whether or not the convergence distance setting value changed; and
an output unit configured to output a first convergence distance information derived by the deriving unit or a second convergence distance information derived prior to the first convergence distance information by the deriving unit based on the determination made by the determination unit,
wherein the output unit outputs the first convergence distance information when the determination unit determines the convergence distance setting value being changed, and outputs the second convergence distance information when the determination unit does not determine the convergence distance setting value being changed.

36. An information output apparatus, comprising:
a setting unit configured to set a convergence angle setting value;

a drive controller configured to control a drive of a shift lens or a variable apex angle prism so as to suppress a change of a convergence angle information which is based on a change of a position of a zoom lens;

a deriving unit configured to derive the convergence angle information based on a position of the shift lens or a state of the variable apex angle prism, and a position of the zoom lens;

a determination unit configured to determine whether or not the convergence angle setting value changed; and an output unit configured to output a first convergence angle information derived by the deriving unit or a second convergence angle information derived prior to the first convergence angle information by the deriving unit based on the determination made by the determination unit, wherein the output unit outputs the first convergence angle information when the determination unit determines the convergence angle setting value being changed, and outputs the second convergence angle information when the determination unit does not determine the convergence angle setting value being changed.

37. A lens apparatus comprising:

a shift lens or a variable apex angle prism;

a zoom lens;

an information output apparatus, comprising:

a setting unit configured to set a convergence angle setting value;

a drive controller configured to control a drive of the shift lens or the variable apex angle prism so as to suppress a change of a convergence angle information which is based on a change of a position of the zoom lens;

a deriving unit configured to derive the convergence angle information based on a position of the shift lens or a state of the variable apex angle prism, and a position of the zoom lens;

a determination unit configured to determine whether or not the convergence angle setting value changed; and an output unit configured to output a first convergence angle information derived by the deriving unit or a second convergence angle information derived prior to the first convergence angle information by the deriving unit based on the determination made by the determination unit, wherein the output unit outputs the first convergence angle information when the determination unit determines the convergence angle setting value being changed, and outputs the second convergence angle information when the determination unit does not determine the convergence angle setting value being changed.

* * * * *